United States Patent
Allen et al.

(10) Patent No.: US 7,254,471 B2
(45) Date of Patent: Aug. 7, 2007

(54) TRANSFER CASE HAVING SELECTABLE DRIVING MODES SUITED TO MOTOR VEHICLE LOAD AND ROAD CONDITIONS

(75) Inventors: Timothy Allen, Livonia, MI (US); Steve Thomas, Bloomfield Hills, MI (US); Juliette McCoy, Macomb Township, MI (US); Hong Jiang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 11/179,116

(22) Filed: Jul. 12, 2005

(65) Prior Publication Data

US 2007/0016351 A1    Jan. 18, 2007

(51) Int. Cl.
*G06F 7/00* (2006.01)
(52) U.S. Cl. ............................. 701/51; 180/248; 701/61
(58) Field of Classification Search ............ 701/51–68; 74/335–337; 180/244–249; 475/118–128
See application file for complete search history.

(56) References Cited

U.S. PATENT DOCUMENTS

| 6,213,242 B1 * | 4/2001 | Rodrigues et al. ........... 180/249 |
| 7,188,017 B2 * | 3/2007 | Rodrigues et al. ............ 701/67 |
| 7,212,898 B2 * | 5/2007 | Whitton et al. ................ 701/51 |

* cited by examiner

*Primary Examiner*—Richard M. Camby
(74) *Attorney, Agent, or Firm*—David B. Kelley; MacMillan, Sobanski & Todd, LLC (57) ABSTRACT

A motor vehicle powertrain includes a transmission producing multiple speed ratios, and a transfer case including a second input driveably connected to the transmission output, a second output continually driveably connected to a first set of wheels and releasably connected to a second set of wheels, for producing alternately in the transfer case a low speed ratio and a high speed ratio. A mode selector produces a signal representing a desired driving mode. A controller, responsive to the signals produced by the mode selector, controls the transmission to produce alternately the multiple speed ratios of the transmission, and for controls the transfer case to operate alternately in the low speed ratio and high speed ratio that corresponds to the desired driving mode and a current speed ratio produced by the transmission.

16 Claims, 5 Drawing Sheets

| Speed | 5R55S / ATC Driving Modes ||||
|---|---|---|---|---|
| | Normal 4x2 & 4x4 High | Snow | Trailer Tow | 4x4 Low |
| 1st | 3.72 ($T_2, A_{low}$) | 3.22 ($T_1, A_{1:1}$) | 5.23 ($T_1, A_{low}$) | 5.23 ($T_1, A_{low}$) |
| 2nd | 2.29 ($T_2, A_{1:1}$) | 2.29 ($T_2, A_{1:1}$) | 3.22 ($T_1, A_{1:1}$) | 3.72 ($T_2, A_{low}$) |
| 3rd | 1.55 ($T_3, A_{1:1}$) | 1.55 ($T_3, A_{1:1}$) | 2.29 ($T_2, A_{1:1}$) | 2.51 ($T_3, A_{low}$) |
| 4th | 1.00 ($T_4, A_{1:1}$) | 1.00 ($T_4, A_{1:1}$) | 1.55 ($T_3, A_{1:1}$) | 1.62 ($T_4, A_{low}$) |
| 5th | 0.71 ($T_5, A_{1:1}$) | 0.71 ($T_5, A_{1:1}$) | 1.00 ($T_4, A_{1:1}$) | 1.16 ($T_5, A_{low}$) |
| 6th | | | 0.71 ($T_5, A_{1:1}$) | |

| Transmission Gear | T Input / output |
|---|---|
| 1st | 3.22 |
| 2nd | 2.29 |
| 3rd | 1.55 |
| 4th | 1.00 |
| 5th | .71 |

| 5R55S / ATC Driving Modes | | | | |
|---|---|---|---|---|
| Speed | Normal 4x2 & 4x4 High | Snow | Trailer Tow | 4x4 Low |
| 1st | 3.72 ($T_2,A_{low}$) | 3.22 ($T_1,A_{1:1}$) | 5.23 ($T_1,A_{low}$) | 5.23 ($T_1,A_{low}$) |
| 2nd | 2.29 ($T_2,A_{1:1}$) | 2.29 ($T_2,A_{1:1}$) | 3.22 ($T_1,A_{1:1}$) | 3.72 ($T_2,A_{low}$) |
| 3rd | 1.55 ($T_3,A_{1:1}$) | 1.55 ($T_3,A_{1:1}$) | 2.29 ($T_2,A_{1:1}$) | 2.51 ($T_3,A_{low}$) |
| 4th | 1.00 ($T_4,A_{1:1}$) | 1.00 ($T_4,A_{1:1}$) | 1.55 ($T_3,A_{1:1}$) | 1.62 ($T_4,A_{low}$) |
| 5th | 0.71 ($T_5,A_{1:1}$) | 0.71 ($T_5,A_{1:1}$) | 1.00 ($T_4,A_{1:1}$) | 1.16 ($T_5,A_{low}$) |
| 6th | | | 0.71 ($T_5,A_{1:1}$) | |

*Figure 6*

TRANSFER CASE HAVING SELECTABLE DRIVING MODES SUITED TO MOTOR VEHICLE LOAD AND ROAD CONDITIONS

BACKGROUND OF THE INVENTION

1. Field of the Invention

This invention relates to a powertrain for motor vehicles, in particular to a powertrain having a multiple speed transmission and a transfer case for directing power to front wheels and rear wheels.

2. Description of the Prior Art

A transfer case usually includes a planetary gear set for producing either a "high" range, in which the transfer case output is driven at the same speed as the input, or a "low" range, in which the output is driven slower than its input speed. The 4×2 and 4×4 states of the transfer case are usually selected manually by the vehicle operator by operating a selector, such as a lever or switch. A first position of the selector causes a range selection device in the transfer case to direct power from the transmission output to a rear drive axle, 4×2 drive operation. A second position of the selector causes the transfer case to direct power to both the front drive axle and a rear drive axle, 4×4 drive operation.

Conventionally the high and low ranges are produced by alternately engaging and disengaging a hydraulically actuated range coupler, such as a clutch or synchronizer. When 4×4 drive operation is selected, a hydraulic clutch is engaged; when 4×2 drive operation is selected, the clutch is disengaged. The clutch that controls the 4×4 and 4×2 drive operation typically includes a clutch pack of alternating spacer plates and friction discs, which are forced into mutual friction contact when a piston located in a cylinder is pressurized with hydraulic fluid, thereby engaging the clutch. The clutch is disengaged by venting the cylinder, which allows a spring to release the piston allowing the plates and discs to separate.

A power transmission, which may be controlled manually or automatically to produce multiple speed ratios of the speed of the engine and the speed of its output, is driveably connected to the input of the transfer case, which contains a gearset that produces alternately a high speed ratio range and a low speed ratio range.

There is a need to coordinate control of the transmission and of the transfer case such that the powertrain can increase the available span of speed ratios produced by the transmission alone, and provide selectable driving modes, for which the speed ratios, steps and span correspond to an ideal for the selected operating mode.

SUMMARY OF THE INVENTION

A motor vehicle powertrain according to this invention includes a transmission producing multiple speed ratios, and a transfer case including a second input driveably connected to the transmission output, a second output continually driveably connected to a first set of wheels and releasably connected to a second set of wheels, for producing alternately in the transfer case a low speed ratio and a high speed ratio. A mode selector produces a signal representing a desired driving mode. A controller, responsive to the signals produced by the mode selector, controls the transmission to produce alternately the multiple speed ratios of the transmission, and for controls the transfer case to operate alternately in the low speed ratio and high speed ratio that corresponds to the desired driving mode and a current speed ratio produced by the transmission.

A powertrain according to this invention improves fuel vehicle economy, expands the speed ratio span of the transmission, and improves vehicle performance. The powertrain provides a driving mode that is uniquely suited to operation on roads that are wet, snow covered, or have a granular surface when a snow mode is selected. While operating in snow mode, the vehicle launches or accelerates from a stopped condition with the transmission operating in its highest speed ratio and transfer case operating in its lowest speed ratios. Thereafter, the powertrain upshifts sequentially through the higher gears of the transmission while maintaining the transfer case in the lowest speed ratio.

If the vehicle is towing a heavy load or otherwise heavily loaded, the powertrain can operate in tow mode to provide an additional speed ratio, in addition to the number of speed ratios produced by the transmission. While operating in tow mode, the vehicle accelerates from a stopped condition with the transmission and transfer case both operating in their highest ratios, such that the vehicle launches with the greatest magnitude of wheel torque. The powertrain upshifts to a second speed ratio by maintaining the transmission in its highest gear ratio and changing the transfer case to its lowest speed ratio. Thereafter, the powertrain upshifts sequentially through the higher gears of the transmission while maintaining the transfer case in the lowest speed ratio.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
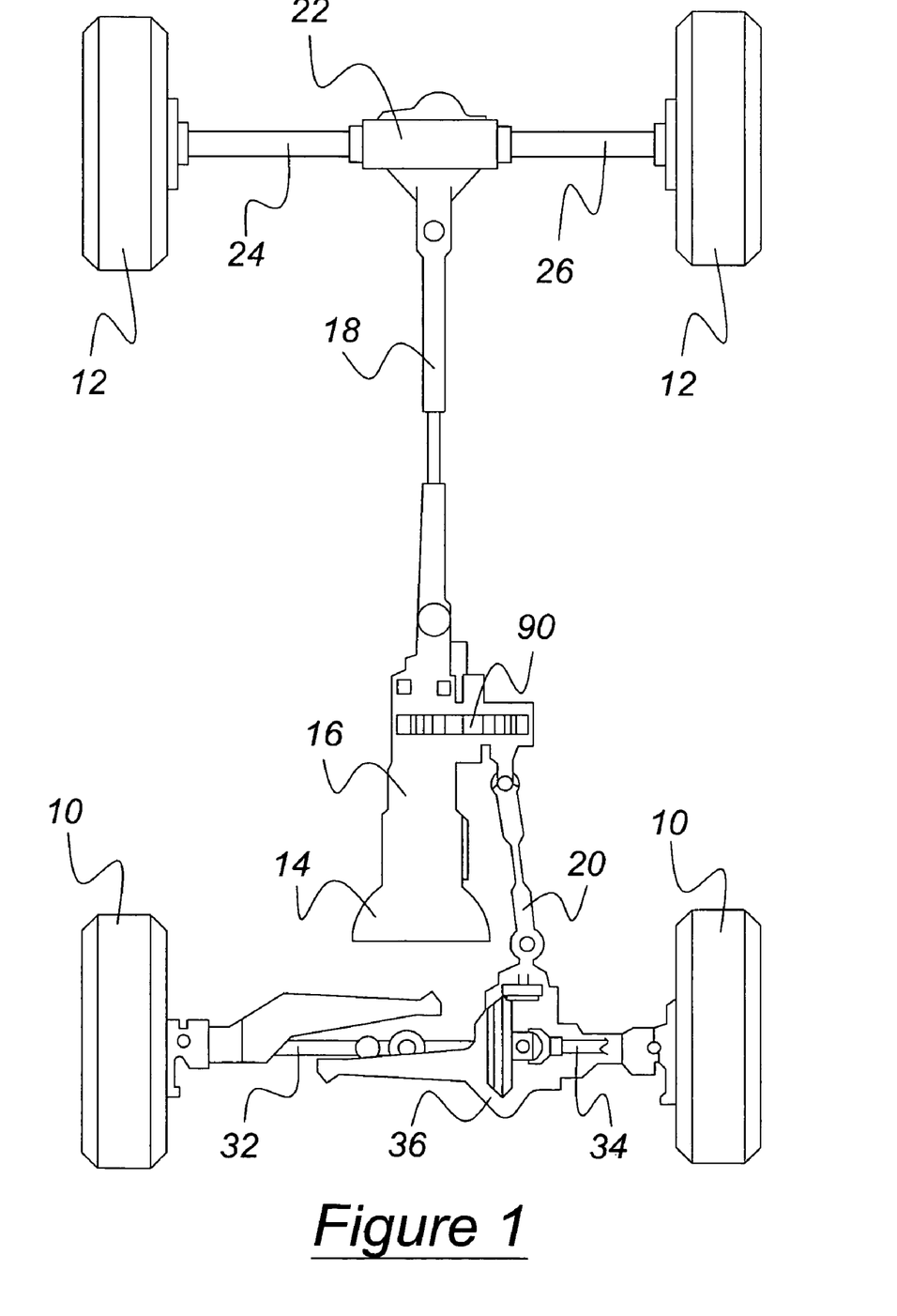
FIG. 1 is a top view of a motor vehicle driveline having a transmission, transfer case, and drive shafts extending to front wheels and rear wheels.

With reference now to the drawings and particularly to FIG. 1, the powertrain of a motor vehicle, to which the present invention can be applied, includes front and rear wheels 10, 12, a power transmission 14 for producing multiple forward and reverse speed ratios driven by an engine (not shown), and a transfer case 16 for continuously driveably connecting the transmission output to a rear drive shaft 18. The transfer case 16 selectively connects the transmission output to both the front drive shaft 20 and rear drive shaft 18 when a four-wheel drive mode of operation is selected, either manually or electronically. Shaft 18 transmits power to a rear wheel differential mechanism 22, from which power is transmitted differentially to the rear wheels 12 through axle shafts 24, 26, which are contained within a differential housing. The front wheels are driveably connected to right-hand and left-hand axle shafts 32, 34, to which power is transmitted from the front drive shaft 20 through a front differential mechanism 36.

Figure 2A:
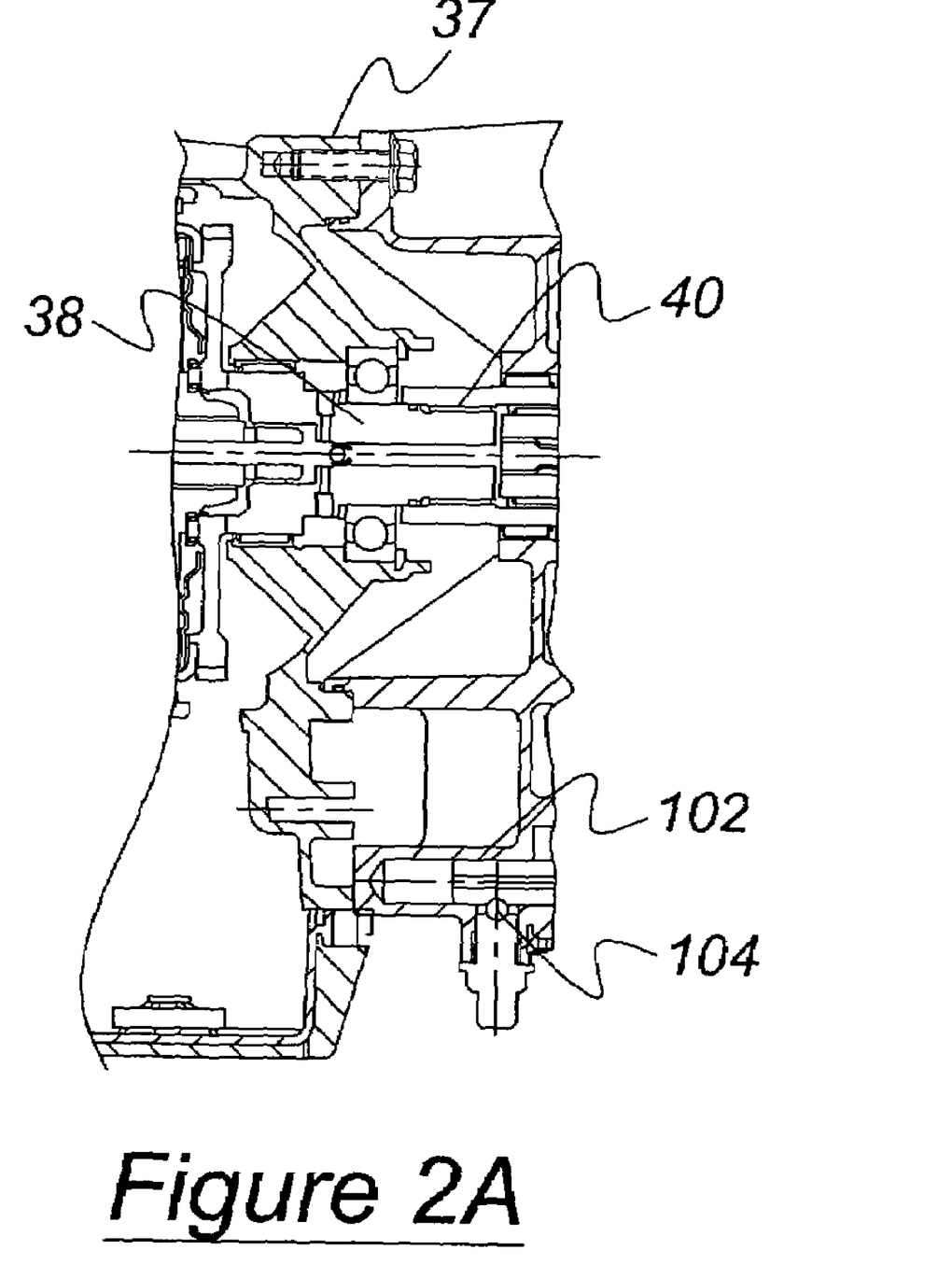
FIGS. 2A and 2B are left-hand and right-hand portions, respectively, of a cross sectional side view showing an integrated transfer case and a portion of an automatic transmission.
Figure 2B:
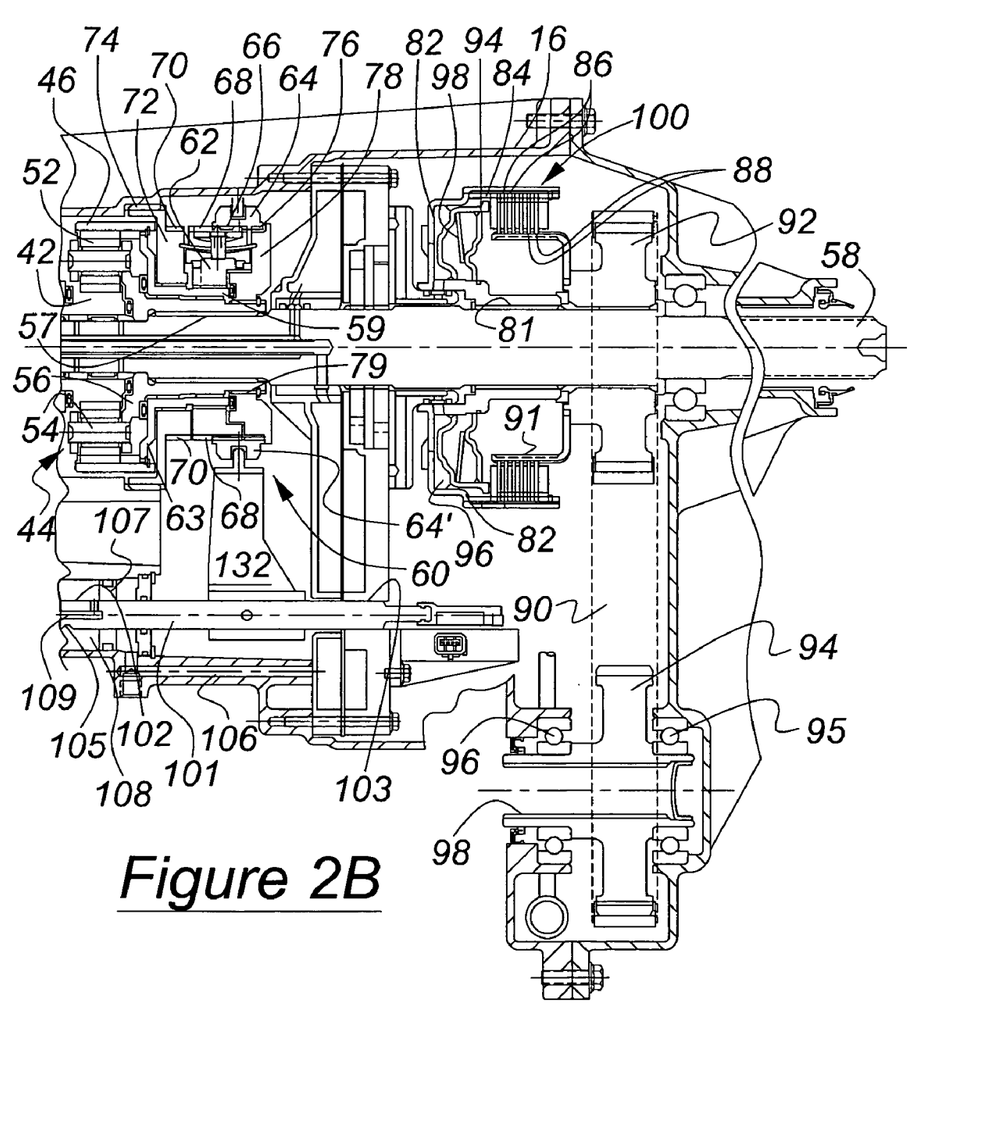

Referring now to FIGS. 2A and 2B, the output shaft 38 of the automatic transmission 14 extends through the transmission casing 37 into the casing 16 of the transfer case. Shaft 38 is driveably connected through a spline 40 to the sun gear 42 of a simple planetary gearset, an epicyclic gearset 44. Sun gear 42 is in continuous meshing engagement with a set of planet pinions 52, which are supported for a rotation on stub shafts 54, each stub shaft supported at opposite axial ends on a carrier 56. Each of the planet pinions 52 is in continuous meshing engagement with the sun gear 42 and a ring gear 46. Carrier 56 is driveably connected through spline 57 to the output 58 of the transfer case, which is adapted for connection to the rear driveshaft 18.

A high-low coupler 60 includes a hub 62, which is driveably connected through a spline 59 and radial disc 63 to ring gear 46. Coupler 60 includes a sleeve 64, formed on its inside surface with a system of axially directed spline teeth 66, engaged continuously with a system of spline teeth 68 formed on the outer surface of the hub 62. The sleeve 64 slides axially leftward and rightward on the hub. In FIG. 2, the coupler 60 shown above the axis of output shaft 58 is a synchronizer; the coupler shown below that axis is a dog clutch.

The teeth 66 of the sleeve 64 are engageable alternately with axially directed spline teeth 70 formed on a radially outer surface of a disc 72, which is continually fixed against a rotation by its engagement at 74 with teeth formed on the inner surface of the transfer case 16. The teeth 66 of sleeve 64 are engageable also with a system of axially directed spline teeth 76 formed on a radially outer surface of a disc 78.

Disc 78 is splined at 79 to carrier 56, which is splined at 57 to output shaft 58. Spline 81 driveably connects shaft 58 to a drum 82, which is formed on its inner surface with axially directed spline teeth 84. Spacer plates 86 are driveably engaged with the spline 84 of drum 82. Friction discs 88, interposed between adjacent spacer plates 86, are driveably engaged by spline teeth formed on the outer surface of an arm 91, which extends axially from a drive belt sprocket wheel 92.

Located within drum 82 is a hydraulically actuated piston 94, which moves axially in response to the pressurized and vented state of a hydraulic cylinder 96 located between drum 82 and piston 94. When cylinder 96 is pressurized, piston 94 moves rightward forcing the spacer plates 86 and friction discs 88 into mutual frictional engagement, thereby driveably connecting output 58 and sprocket wheel 92. When cylinder 96 is vented, piston 94 is moved leftward to the position shown in FIG. 2 due to a force applied to the piston by a Belleville spring 98, thereby driveably disconnecting output 58 and sprocket wheel 92. In this way, clutch 100 alternately driveably connects and disconnects output 58 and sprocket wheel 92.

When clutch 100 is engaged, power is transmitted to the forward drive shaft 20 from the output shaft 58 by a drive belt 90, which is continually engaged with sprocket wheel 92. Bearings 95, 96 rotatably support sprocket wheel 94 on the transfer case 16, and forward drive shaft 20 is driveably connected through a spline 98 formed on the inner surface of the sprocket wheel 94. In this way, when clutch 100 is engaged, output shaft 80 transmits power both to the rear drive shaft 18, which is connected by a universal joint to output shaft 80, and to the forward drive shaft 20.

In operation, drive shaft 20 is driven alternately at the same speed as that of the transmission output shaft 38, or shaft 20 is underdriven in relation to the speed of shaft 38, in accordance with the position of the coupler sleeve 64.

Carrier 56 is continually driveably connected to output shaft 58 through spline 57. Ring gear 46 is driveably connected to output shaft 58 through the torque delivery path that includes disc 63, coupler hub 62, coupler sleeve 64, disc 78 and splines 79, 57. Therefore, when sleeve 64 moves rightward to the position shown in FIG. 2, ring gear 46 and carrier 56 are mutually driveably connected, and ring gear 46, carrier 56 and output 58 are driven at the same speed as that of sun gear 42 and the input 38. This is the high-speed range.

When sleeve 64 of coupler 60 is moved leftward to produce a drive connection between disc 72 and coupler hub 62, ring gear 46 is fixed against rotation on the transfer case 16 through the torque path that includes disc 63, coupler hub 62, its sleeve 64 and disc 72. This provides a torque reaction and causes carrier 56 and output 58 to be underdriven in relation to the speed of sun gear 42 and shaft 38. This creates a low-range drive connection between transmission output 38 and the transfer case output 58.

Clutch 100 can be engaged regardless of the position of coupler sleeve 64 so that power is transmitted by the drive belt mechanism, which includes sprocket wheels 92, 94 and drive belt 90. In this way, both the forward drive shaft 20 and rear drive shaft 18 are driven alternately in the low-range and high-range, or only the rear drive shaft is driven in the low-range and high-range.

FIG. 2B shows a shift fork 132 fixed to a shift rail 101, which is journalled for lateral displacement at 102, 103 on the case 16. The shift rail 101 moves between detent positions 104, 105, representing the low range and high range, respectively. The shift rail moves in response to hydraulic pressure applied and vented alternately to opposite sides of a piston 107 located in a cylinder 108. Pressure applied to piston 107 through passage 109 moves the piston rightward. Pressure applied to piston 107 through passage 106 moves the piston leftward.

Figure 3:
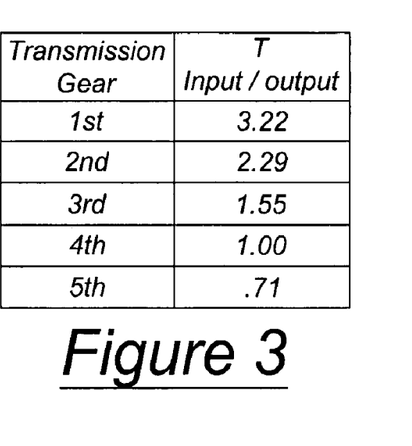
FIG. 3 is a schedule showing the speed ratios for each of the forward gears of the transmission.

FIG. 3 is a schedule of the speed ratios and the corresponding gear produced by an automatic transmission 14 suited for use with transfer case 16, the transmission being capable of producing five discrete forward speed ratios. Preferably, the transfer case 16 produces a speed ratio whose magnitude is 1.62 when operating in the low range, and a speed ratio whose magnitude is 1.00 when operating in the high range.

Figure 4:
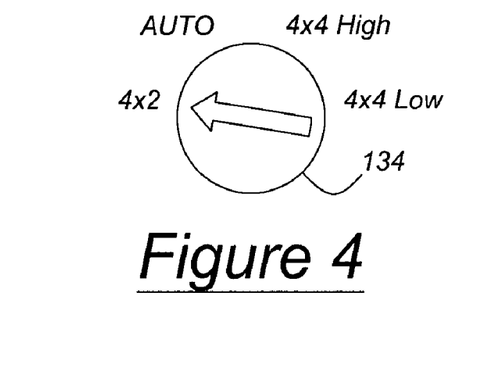
FIG. 4 is a selector dial operated by the vehicle operator for selecting the operating range of the transfer case.

FIG. 4 is a selector dial 134 operated manually by the vehicle operator for selecting among 4×2, automatic, 4×4 High and 4×4 Low ranges, in which the transfer case 14 is to operate. When automatic operation is selected, a controller automatically selects the appropriate mode for the current drive conditions.

Figure 5:
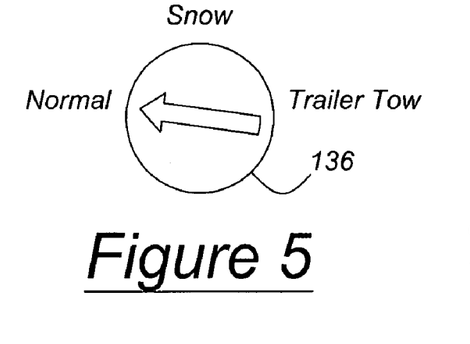
FIG. 5 is a selector dial operated by the vehicle operator for selecting the operating mode for the transfer case and transmission.

FIG. 5 is a selector dial 136 operated manually by the vehicle operator for selecting among Normal, Snow/Winter, and Trailer Tow modes, in which the transfer case 14 and transmission 16 are to operate. Generally, the Normal mode is selected. But when the road surface is wet, granular or slippery, the Snow/Winter mode is preferred. When the vehicle is carrying or towing a heavy load, the Trailer Tow mode is preferred.

Figure 6:
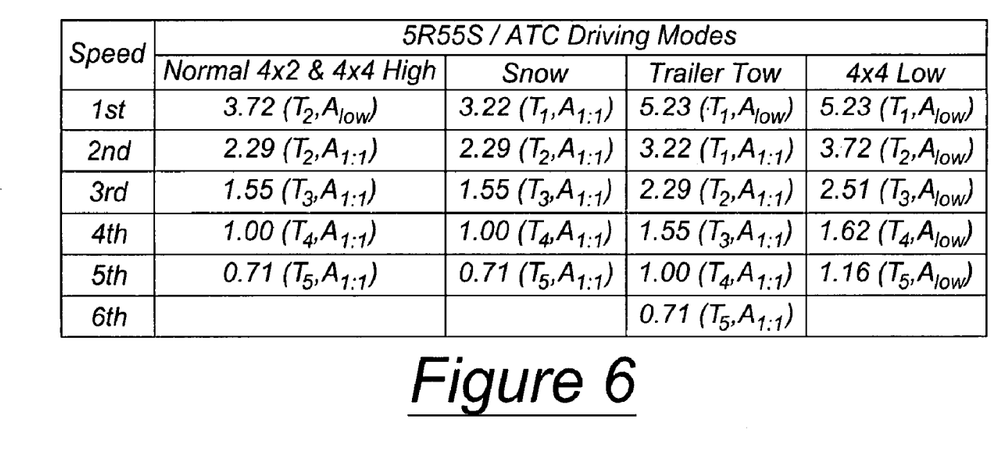
FIG. 6 is a schedule of the speed ratios produced by the transmission and transfer case operating in combination.
Figure 7:
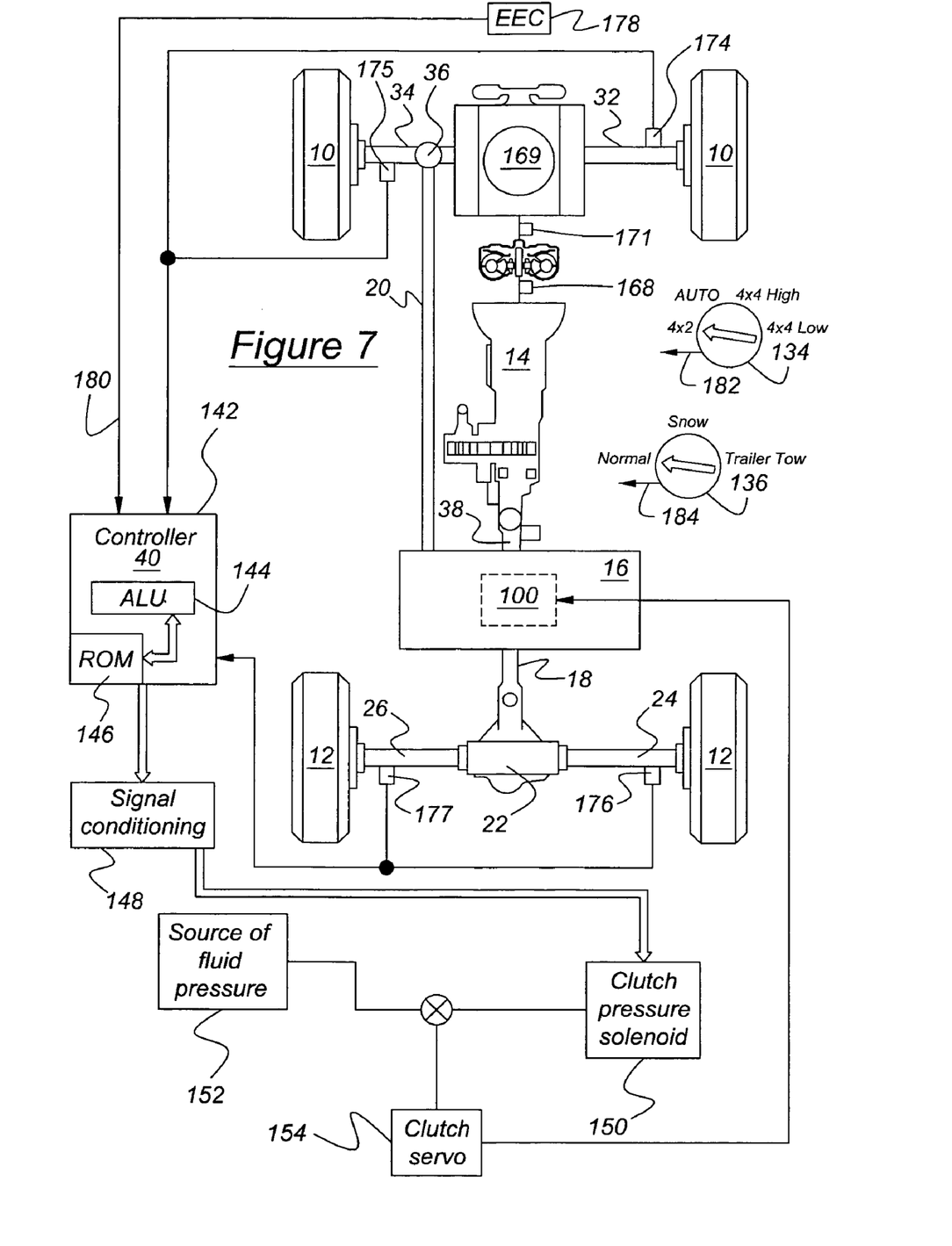
FIG. 7 is a schematic diagram of a system for controlling the transmission and transfer case.

FIG. 6 is a schedule of the ratios of the speed of the transmission input and transfer case output produced by the transmission 14 and transfer case 16 operating in combination and in accordance with the ranges of FIG. 4 and the modes of FIG. 5. The speed ratio produced by the powertrain is a function of the transmission gear $T_n$ and the transfer case speed range, $A_{low}$ or $A_{1:1}$. An electronic controller, such as that illustrated in FIG. 7, issues commands that which cause the transmission 14 to change the gear produced by the transmission, preferably with reference to the selected range and mode and such operating parameters as the engine throttle position, vehicle speed, engine speed, and wheel torque commands initiated by the vehicle operator. The controller also changes the speed ratio range produced by the transfer case in accordance with the selected range and mode and the operating gear of the transmission.

As illustrated in FIG. 6, when Normal mode is selected and either 4×2 or 4×4 High ranges are selected, the vehicle is accelerated from a stopped condition with the transfer case operating in the high speed ratio range $A_{low}$ and the transmission producing its second gear $T_2$, i.e., its second highest speed ratio. The resulting speed ratio is 3.72. Then the transfer case changes to its low speed ratio range $A_{1:1}$, the transmission remains in second gear $T_2$, and the resulting speed ratio is 2.29. The third, fourth and fifth speeds are produced with the transfer case in its low-speed ratio range $A_{1:1}$, and the transmission upshifting sequentially to third, fourth and fifth gears. The resulting speed ratios are 1.55, 1.00, and 0.71, respectively.

When Snow/Winter mode is selected, the transmission produces sequentially each of its five forward speed ratios $T_n$, and the transfer case operates in the low speed ratio range $A_{1:1}$. The resulting speed ratios are 3.22, 2.29, 1.55, 1.00, and 0.71, respectively.

When Trailer Tow mode is selected, the vehicle is accelerated from a stopped condition with the transfer case operating in the high speed ratio range $A_{low}$ and the transmission producing its first gear $T_1$, its highest speed ratio. The resulting speed ratio is 5.23. Then the transfer case changes to its low-speed ratio range $A_{1:1}$, the transmission remains in first gear $T_1$, and the resulting speed ratio is 3.22. The third, fourth, fifth and sixth speeds are produced with the transfer case in its low-speed ratio range $A_{1:1}$, and the transmission upshifting sequentially to second, third, fourth, and fifth gears. The resulting speed ratios are 2.29, 1.55, 1.00, and 0.71, respectively.

When 4×4 Low range is selected, the transmission produces sequentially each of its five forward speed ratios $T_n$, and the transfer case operates in the high speed ratio range $A_{low}$. The resulting speed ratios are 5.23, 3.72, 2.51, 1.62 and 1.16, respectively.

Referring now to FIG. 7, there is shown a control system deployed in a four-wheel drive vehicle. Torque produced by the engine 140 is transmitted to the transfer case 16 at multiple speed ratios produced by an automatic transmission 14 located in the torque path between the engine and transfer case. The rear drive shaft 18 is continually connected to the transfer case output 58, but clutch 100 transmits a variable portion of that input torque to the front driveshaft 20 in accordance with the degree to which clutch 100 is engaged. Clutch slip, the difference in speed of the rear driveshaft 18 and front driveshaft 20, is a measure of the degree of engagement of clutch 100.

The transfer case control system includes a microcontroller or digital computer 142 operating under program control having a central processing unit that includes an arithmetic logic unit 144 ALU; electronic memory 146 containing control algorithms, data, functions, scalar values and routines for producing data and information representing current operating conditions of the powertrain; input/output devices for acquiring, conditioning and transmitting signals produced by data sensors; and control devices that respond to command signals generated by the computer. Controller 142 further includes continual data communication links among its CPU, ALU, I/O, and memory.

Controller 142 receives signals generated by sensors, processes and uses the input signals to determine the gear to be produced by the transmission 14, correct magnitude of torque to be transmitted to front and rear driveshafts 20, 18, the magnitude of slip across clutch 100 resulting from its state of engagement and disengagement, and the range to be produced by the epicyclic gearset 44 of the transfer case 16. Based upon these determinations, controller 142 generates command signals transmitted to clutch 100, the hydraulic valves that control the clutches and brakes of the transmission which produce the desired gear, and the hydraulic system that controls synchronizer 60 which produces the desired range of the transfer case.

In the preferred embodiment, controller 142 is a powertrain controller that includes one or more digital microprocessors or digital computers, which cooperatively perform calculations, and execute subroutines and control algorithms. Controller 142 generates a variable force solenoid (VFS) command or output signal, which controls the amount of slippage between the friction discs and spacer plates of clutch 100, thereby controlling the relative magnitudes of torque and power transmitted to front driveshaft 22 from the output 58 and rear driveshaft 26. The duty cycle of the VFS signal is the percentage of the cycle time for which the signal is activated or enabled. The output signal produced by controller 144 is conditioned at 148 and then communicated to a variable force solenoid 150, which operates to open and close a source of fluid pressure 152 to a clutch servo 154, through which clutch cylinder 96 is alternately pressurized and vented. The clutch duty cycle is interchangeably referred to as a command, clutch output, and torque output.

Sensor 168 produces an input signal representing speed of the transmission input, and sensor 171 produces an input signal representing speed of the engine shaft. The sensors that provide input to the controller 142 include right and left front wheel speed sensors 174, 175, and right and left rear wheel speed sensors 176, 177. The speeds of the front sensors 174-177 are averaged, filtered and forwarded to controller 142 from an ABS controller (not shown). Controller 142 determines the speed of the front driveshaft 20 and speed of the rear driveshaft 18 from the processed output produced by the wheel speed sensors. Controller 142 determines the vehicle speed from these drive shaft speed input signals.

Electronic engine control unit 178 includes sensors that produce input signals representing engine operating parameters, which may include air mass flow rate, engine throttle position, barometric pressure, air charge temperature, spark timing, engine speed NE, fuel flow, cam timing and other information used as indices to determine current engine output torque from data stored in computer memory. Generally, information for determining current engine torque is stored in the form of look-up tables or regressive polynomials established by dynamometer testing of the engine.

In the preferred embodiment, the EEC 178 includes a throttle position sensor, which measures and/or detects the position of the engine throttle, and transmits a signal representing this position to controller 142. EEC 178 may include one or more conventional engine speed, vehicle speed and/or acceleration sensors. With reference to current engine operating condition data, EEC 178 continually produces a signal representing current engine output torque and throttle position, which signals are received as input 180 by the controller 142. Selectors 134, 136 produce input signals 182, 184, respectively, which are transmitted to the controller 142.

The controller 142 uses the engine throttle position, vehicle speed, current gear, and engine speed to determine the desired gear with reference to a stored control algorithm, which relates these operating parameters to the desired operating gear. The controller produces command signals to multiple solenoids of the transmission control system. The solenoids alternately engage and disengage the clutch and brakes of the transmission control system in response to the command signals, thereby causing an upshift or downshift of the transmission to the current desired gear.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A motor vehicle powertrain producing multiple-speeds comprising:
   a transmission including an input and an output, the transmission producing multiple ratios of a speed of the input and a speed of the output;
   a transfer case including a second input driveably connected to the transmission output, a second output continually driveably connected to a first set of wheels and releasably connected to a second set of wheels, and a gearset for producing alternately in the transfer case a low speed ratio and a high speed ratio;
   a mode selector for producing a signal representing a desired driving mode; and
   a controller, responsive to the signals produced by the mode selector, and accessible to a schedule of transmission speed ratios and transfer case speed ratios that correspond to a desired driving mode, for controlling the transmission to produce alternately the multiple speed ratios of the transmission, and for controlling the transfer case to operate alternately in the low speed ratio and high speed ratio that corresponds to the desired driving mode and a current speed ratio produced by the transmission.

2. The powertrain of claim 1 further comprising:
   a range selector for producing a signal representing one of a desired two-wheel drive range and four-wheel drive range produced by the transfer case; and
   wherein the controller, responsive to the signals produced by the mode selector and range selector, further controls the transfer case to operate alternately in one of the desired two-wheel drive range and four-wheel drive range produced by the transfer case.

3. The powertrain of claim 1 wherein:
   the mode selector produces a signal representing a first desired driving mode; and
   the controller further controls the powertrain to produce a first, second, third, fourth, and fifth speed by controlling the transfer case to operate continually in the high speed ratio, and the transmission to produce a first, second, third, fourth and fifth speed ratio, respectively, when a current signal produced by the mode selector represents the first driving mode.

4. The powertrain of claim 1 wherein:
   the mode selector produces a signal representing a second desired driving mode; and
   the controller controls the powertrain to produce a first speed by controlling the transfer case to operate in the high speed ratio and the transmission to produce a first speed ratio when a current signal produced by the mode selector represents the second driving mode.

5. The powertrain of claim 1 wherein:
   the mode selector produces a signal representing a second desired driving mode; and
   the controller further controls the powertrain to produce
   a first speed by controlling the transfer case to operate in the high speed ratio and the transmission to produce a first speed ratio,
   a second speed by controlling the transfer case to operate in the low speed ratio and the transmission to produce a first speed ratio, and
   third, fourth, fifth and sixth speeds by controlling the transfer case to operate in the low speed ratio and the transmission to produce a second, third, fourth and fifth speed ratio, respectively, when a current signal produced by the mode selector represents the second driving mode.

6. The powertrain of claim 1 wherein:
   the mode selector produces a signal representing a third desired driving mode; and
   the controller further controls the powertrain to produce
   a first speed by controlling the transfer case to operate in the high speed ratio and the transmission to produce a second speed ratio,
   a second, third, fourth and fifth speed by controlling the transfer case to operate in the low speed ratio and the transmission to produce a second, third, fourth and fifth speed ratio, respectively, when a current signal produced by the mode selector represents the third driving mode.

7. The powertrain of claim 1 further comprising:
   a range selector for producing a signal representing one of a desired two-wheel drive range and four-wheel drive range produced by the transfer case; and
   wherein the mode selector produces a signal representing a third desired driving mode; and
   the controller further controls the powertrain to produce
   a first speed by controlling the transfer case to operate in the high speed ratio, and four-wheel drive range, and the transmission to produce a second speed ratio,
   a second, third, fourth and fifth speed by controlling the transfer case to operate in the low speed ratio and the transmission to produce a second, third, fourth and fifth speed ratio, respectively, when a current signal produced by the mode selector represents the third driving mode and a current signal produced by the range selector represents the four-wheel drive range.

8. The powertrain of claim 1 further comprising:
   a range selector for producing a signal representing one of a desired two-wheel drive range and four-wheel drive range produced by the transfer case; and
   wherein the mode selector produces a signal representing a fourth desired driving mode; and
   the controller further controls the powertrain to produce a first, second, third, fourth and fifth speed by controlling the transfer case to operate in the high speed ratio and the transmission to produce a first, second, third, fourth and fifth speed ratio, respectively, when a current signal produced by the mode selector represents the fourth driving mode and a current signal produced by the range selector represents the four-wheel drive range.

9. A method for controlling a motor vehicle powertrain that includes a transmission that produces multiple speed ratios, and a transfer case driveably connected to the transmission output, connected to a first set of wheels and releasably connected to a second set of wheels, for producing alternately a low speed ratio and a high speed ratio, the method comprising the steps of:

defining a schedule of transmission speed ratios and transfer case speed ratios corresponding respectively to multiple desired driving modes;

producing a indication of a desired driving mode, controlling the transmission to produce alternately multiple speed ratios of the transmission; and controlling the transfer case to operate alternately in one of the low speed ratio and the high speed ratio that corresponds to the desired driving mode and a current speed ratio produced by the transmission.

10. The method of claim 9 further comprising:

producing an indication of a desired two-wheel drive range and four-wheel drive range produced by the transfer case; and controlling the transfer case to operate alternately in one of the desired two-wheel drive range and four-wheel drive range produced by the transfer case.

11. The method of claim 9 further comprising:

producing an indication of a first desired driving mode;

controlling the transfer case to operate continually in the high speed ratio; and controlling the transmission to produce a first, second, third, fourth and fifth speed ratio, respectively, when the first driving mode is indicated.

12. The method of claim 9 further comprising:

producing an indication of a second desired driving mode;

controlling the transfer case to operate in the high speed ratio; and controlling the transmission to produce a first speed ratio when the second driving mode is indicated.

13. The method of claim 9 further comprising:

producing an indication of a signal representing a second desired driving mode;

producing a first speed by controlling the transfer case to operate in the high speed ratio while controlling the transmission to produce a first speed ratio;

producing a second speed by controlling the transfer case to operate in the low speed ratio while controlling the transmission to produce a first speed ratio; and producing third, fourth, fifth and sixth speeds by controlling the transfer case to operate in the low speed ratio while controlling the transmission to produce a second, third, fourth and fifth speed ratio, respectively, when the second driving mode is indicated.

14. The method of claim 9 further comprising:

producing an indication representing a third desired driving mode;

producing a first speed by controlling the transfer case to operate in the high speed ratio while controlling the transmission to produce a second speed ratio; and producing second, third, fourth and fifth speeds by controlling the transfer case to operate in the low speed ratio while controlling the transmission to produce a second, third, fourth and fifth speed ratio, respectively, when the third driving mode is indicated.

15. The method of claim 9 further comprising:

producing an indication representing one of a desired two-wheel drive range and four-wheel drive range produced by the transfer case;

producing an indication representing a third desired driving mode;

producing a first speed by controlling the transfer case to operate in the high speed ratio and the four-wheel drive range while controlling the transmission to produce a second speed ratio; and producing second, third, fourth and fifth speeds by controlling the transfer case to operate in the low speed ratio while controlling the transmission to produce a second, third, fourth and fifth speed ratio, respectively, when the third driving mode is indicated and the four-wheel drive range is indicated.

16. The method of claim 9 further comprising:

producing an indication representing one of a desired two-wheel drive range and four-wheel drive range produced by the transfer case;

producing an indication representing a fourth desired driving mode; and controlling the transfer case to operate in the high speed ratio while controlling the transmission to produce a first, second, third, fourth and fifth speed ratio when a the fourth driving mode is indicated and the four-wheel drive range is indicated.

* * * * *